United States Patent [19]
Abnett et al.

[11] 3,715,659
[45] Feb. 6, 1973

[54] INDUCTIVE NON-CONTACT VIBRATION ANALYZER WHICH IS INDEPENDENT OF STANDOFF DISTANCE

[75] Inventors: Albert C. Abnett, Westerville; George B. Foster, Worthington, both of Ohio

[73] Assignee: Reliance Electric Company, Columbus, Ohio

[22] Filed: March 25, 1970

[21] Appl. No.: 22,416

[52] U.S. Cl.....................324/34 D, 73/71.4, 340/261
[51] Int. Cl................................................G01r 33/00
[58] Field of Search.....73/71.4; 323/94 H; 324/34 D, 324/34 P, 34 R, 61 S; 340/261

[56] References Cited

UNITED STATES PATENTS

| | | | |
|---|---|---|---|
| 3,521,158 | 7/1970 | Morrow et al. | 324/34 R |
| 3,488,581 | 1/1970 | Foster | 324/34 R |
| 3,180,136 | 4/1965 | Foster | 324/34 R X |
| 3,353,098 | 11/1967 | Foster et al. | 324/61 S |
| 3,187,256 | 6/1965 | Foster | 324/61 S |

*Primary Examiner*—Robert J. Corcoran
*Attorney*—Le Blanc & Shur

[57] ABSTRACT

Disclosed is a non-contact vibration analyzer that is substantially independent of standoff distance. An inductive probe produces an electrical output having AC and DC components that vary similarly with standoff. An automatic gain control circuit maintains the DC component constant so that the AC output signal is representative of vibration and does not vary with standoff. By connecting the probe through a meter zero potentiometer and switch to a DC meter, the analyzer also indicates shaft runout.

6 Claims, 7 Drawing Figures

INVENTORS
ALBERT C. ABNETT
GEORGE B. FOSTER

BY LeBlanc & Shur
ATTORNEYS

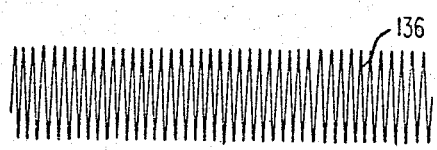
FIG.2A  OSCILLATOR SIGNAL
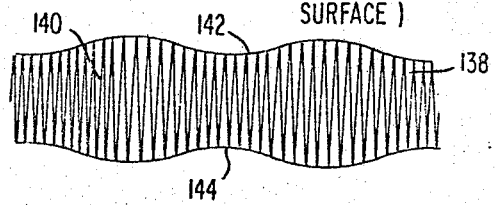
FIG.2B  AMPLIFIER 46 OUTPUT (SENSING VIBRATING SURFACE)
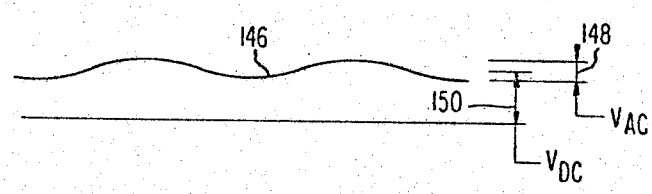
FIG.2C  OUTPUT OF DETECTOR 50 AND FILTER 52 ($V_0$)
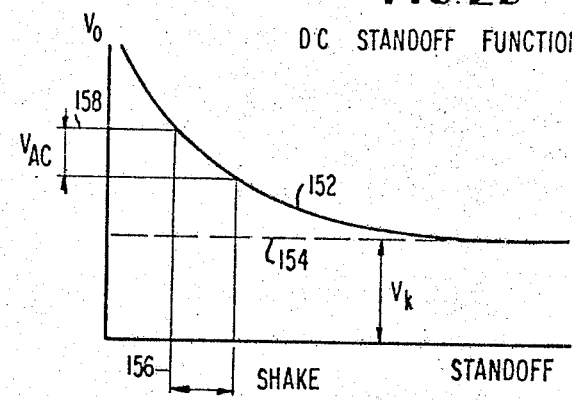
FIG.2D  DC STANDOFF FUNCTION
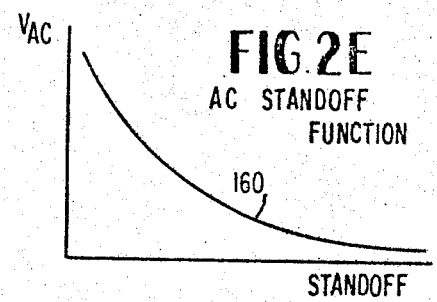
FIG.2E  AC STANDOFF FUNCTION
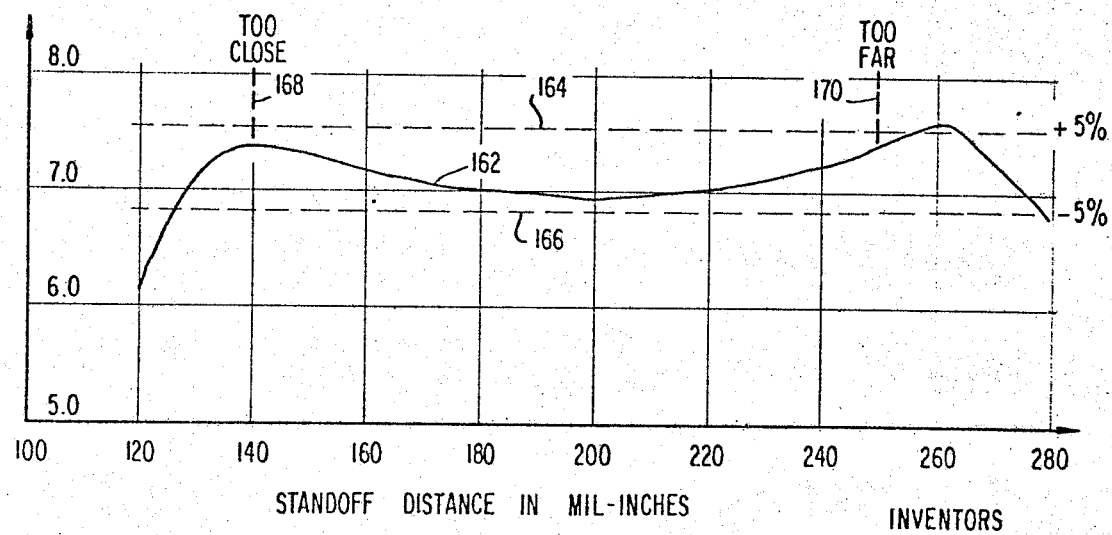
FIG.3
INVENTORS
ALBERT C. ABNETT
GEORGE B. FOSTER
BY Le Blanc & Shur
ATTORNEYS

INDUCTIVE NON-CONTACT VIBRATION ANALYZER WHICH IS INDEPENDENT OF STANDOFF DISTANCE

This invention relates to a self-calibrating non-contact vibration analyzer and more particularly to a vibration analyzer that is independent of standoff distance. The analyzer includes an arrangement for indicating changes in standoff to operate as a form of non-contact dial indicator.

Various arrangements have been proposed in the past for measuring vibration and particularly shaft vibration, as well as the runout of a slowly rotating shaft. In many instances, the vibration monitors have included sensors attached directly to the vibrating equipment to be measured. These constructions have suffered from serious disadvantages, including the fact that it is difficult to measure with them extremely small displacements.

It has also been proposed to measure shaft vibration through the use of so-called non-contacting vibration monitors where the sensor is in the form of a capacitive or inductive probe which is spaced from and does not directly contact the equipment whose vibrations are to be measured. One of the difficulties encountered in the use of non-contacting vibration monitors resides in the fact that the standoff distance or average distance from the measured piece to the probe affects the probe output. That is, the electrical output signal from the probe indicative of vibration is a function not only of the vibration amplitude, but also the standoff distance and tends to vary with standoff. For this reason, prior constructions have incorporated apparatus designed to compensate for standoff variations, thus significantly increasing the overall cost of the instrument.

The present invention is directed to a vibration monitor and more particularly to a complete vibration analyzer of simplified and inexpensive construction in which the analyzer automatically compensates the vibration output signal for changes in standoff distance between the probe and the vibrating equipment. In the present invention, shaft vibration is sensed by a probe system of the non-contacting type in which the electrical output signal indicative of shaft vibration varies exponentially with standoff. Use is made of this exponential characteristic by applying the electrical output of the monitor to an automatic gain control circuit to maintain the DC component of the output signal constant. Since the AC and DC components of the output as a function of standoff are similar, maintaining the DC component constant insures that the AC component is also substantially constant and any variations in magnitude of the output signal are due to changes in vibration and are not a result of changes in standoff distance. The automatic gain control acts as a self-calibrating feedback circuit to render the monitor substantially independent of standoff distance.

In addition, since the DC signal changes with standoff, it is used in the system of the present invention to make the instrument function in the manner of a non-contact dial indicator. The circuit is provided with a meter zero potentiometer which is adjusted to bring the instrument on scale. Since this device is a gain control, it functions in the same manner as the automatic gain control circuit in that it brings incremental gain to a standard value regardless of the standoff. When the instrument is switched to the runout position to operate in the runout mode, the meter indicates changes in standoff such as the runout of a slowly rotating shaft in the same manner as a mechanical dial indicator. By incorporating range switching and tunable filtering, the device of the present invention can be used as a complete vibration analyzer.

It is therefore one object of the present invention to provide an improved vibration analyzer.

Another object of the present invention is to provide a non-contact vibration analyzer that is independent of standoff distance.

Another object of the present invention is to provide a self-calibrating non-contact vibration analyzer incorporating an automatic gain control circuit for maintaining the DC component of the output signal constant.

Another object of the present invention is to provide a standoff independent non-contact vibration analyzer incorporating a runout circuit for indicating changes in standoff distance in the manner of a dial indicator.

These and further objects and advantages of the invention will be more apparent upon reference to the following specification, claims, and appended drawings, wherein:

FIGS. 2A through 2E show waveforms and response characteristics for the vibration analyzer of FIG. 1; and FIG. 3 is a plot of vibration response as a function of standoff distance for the vibration analyzer of FIG. 1.

Figure 1:
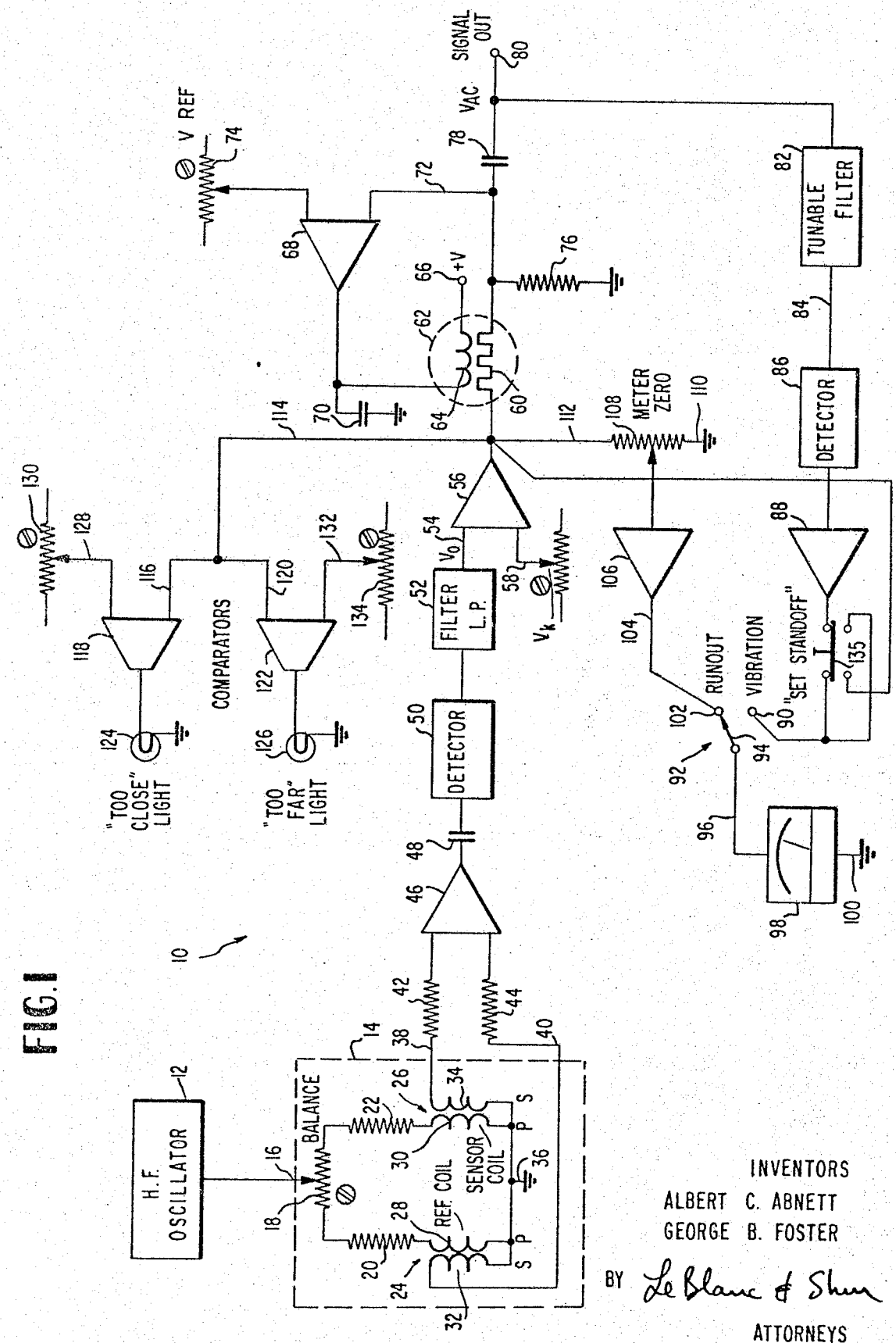
FIG. 1 is an overall block diagram of the complete vibration analyzer of the present invention.

Referring to the drawings and particularly to FIG. 1, the vibration analyzer, generally indicated at 10, comprises a a high frequency oscillator 12 feeding its output to a non-contacting probe indicated by dashed box 14 over lead 16. The probe is in the form of a bridge circuit and comprises a variable resistor or potentiometer 18, a pair of series resistors 20 and 22, and a pair of transformers 24 and 26 having primaries 28 and 30 and secondaries 32 and 34. The lower ends of the transformers are connected to ground as at 36. Primary coil 28 constitutes a reference coil and primary coil 30 constitutes the probe sensor coil. The sensor bridge or probe is excited from oscillator 12 which may operate typically at a frequency of 100 kHz or 1 mHz, depending upon the particular application. As a metal surface is brought into proximity to the sensor transformer 26, the bridge is unbalanced causing an AC signal to appear on the output leads 38 and 40. The amplitude of this signal is a function of both the magnitude of the vibrations of metal surface to be measured and a function of the probe to metal surface standoff distance or average distance between the probe and metal surface. Actually, the unbalanced signal results from both a change in inductance of the sensor coils and a change in the coefficient of coupling between the primary and secondary of sensor transformer 26.

The output on leads 38 and 40 passes through a pair of coupling resistors 42 and 44 to an amplifier 46 and by way of coupling capacitor 48 to a detector 50 and low pass filter 52 to appear as an output signal labeled $V_o$ on lead 54. The output signal is applied to one input of a difference amplifier 56 having its other input connected to a reference voltage source established by the position of potentiometer 58. The reference voltage level established by potentiometer 58 applied to the second input of amplifier 56 is labeled $V_k$. The output of amplifier 56 passes through a light sensitive variable resistor 60 in a common housing indicated by the dashed circle 62 with a light source or electrical filament 64. Filament 64 is connected between a positive voltage source terminal 66 and the output of a differential feedback amplifier 68. The output of amplifier 68 is also returned to ground through capacitor 70, while one input is connected by lead 72 to the other side of light sensitive resitor 60. The other input of amplifier 68 is connected to a reference voltage source with the magnitude established by adjustable potentiometer 74.

Light sensitive resistor 60, in conjunction with a shunt resistor 76, forms a voltage divider with the voltage developed across resistor 76 is applied through a coupling capacitor 78 to an AC voltage signal output terminal 80 with the voltage appearing on this terminal labeled $V_{ac}$.

Connected to AC terminal 80 is the input of a tunable filter 82 whose output is connected by way of lead 84 to a detector 86 and through amplifier 88 to the stationary vibration contact 90 of a manually operated switch indicated generally at 92. Movable contact 94 of the switch is connected by way of lead 96 to the input of a DC meter 98. The other side of the meter is grounded as at 100.

Movable contact 94 of switch 92 may be connected to either stationary vibration contact 90 or to a second stationary contact labeled the runout contact 102, which is connected by way of lead 104 to the output of amplifier 106. The input of amplifier 106 is connected to a meter zero potentiometer 108 whose variable resistance is connected between ground 110 and the output of amplifier 56 by way of lead 112. The output of amplifier 56 is also connected by lead 114 to one input 116 of a comparator 118 and to one input 120 of a comparator 122. The output of comparator 118 energizes a too close light 124 and the output of comparator 122 energizes a too far light 126. The limits for energizing the lights are established by connecting the other input 128 of comparator 118 to a reference voltage potentiometer 130 and by connecting the other input 132 of comparator 122 to a reference voltage potentiometer 134.

FIG. 2A shows the voltage waveform 136 at the output of oscillator 12 appearing on lead 16. The proximity of a ferrous metal, such as SAE 1045 steel or similar carbon steels, produces an unbalance in the bridge of sensor 14 and supplies an output to amplifier 46. The output from amplifier 46 is shown by the waveform 138 in FIG. 2B and comprises a carrier 140 at the frequency of oscillator 12 amplitude modulated by an unbalance signal, as indicated by the envelopes 142 and 144. The modulation is recovered by passing the signal through detector 50 and filter 52 to produce an output signal $V_o$ on lead 54 as shown by the waveform 146 in FIG. 2C. The magnitude of the AC component of the output signal 146 is indicated at 148 in FIG. 2C and the magnitude of the DC component of the output signal is indicated at 150 in that figure.

The magnitude of the AC component of the output shown at 148 in FIG. 2C is a function of both the vibration amplitude of the workpiece being measured and of the standoff distance from the probe to the workpiece. The DC component illustrated at 150 is a function of standoff distance. FIG. 2D shows the DC standoff function with $V_o$ plotted as a function of standoff. The standoff function takes the form of an exponential curve as illustrated at 152 in FIG. 2D, which curve asymptotes to a constant DC voltage level $V_k$ indicated by dashed line 154 as the standoff distance is increased. The AC function of standoff is produced by operation over an intermediate point on the curve 152 as indicated by the shake at 156 to produce an AC output component indicated at 158. This AC component is plotted in FIG. 2E as a function of standoff to give the exponential curve 160 shown in that figure.

It has been found empirically that a large portion of the exponential curve 152 shown in FIG. 2D can be represented by the expression $V_o = AE^{-BS} + V_k$, in which A and B are constant and S is the standoff distance. Since the instrument is constructed to measure vibration, it is the derivative of the curve 152 that is of interest and the derivative curve shows at 160 in FIG. 2E may be represented by $V_{AC} = (dV_o/dS) = -BAE^{-BS}$.

Since both curves 152 and 160 are exponentials, if the constant voltage $V_k$ is removed, both the AC and DC components of the output signal $V_o$ vary in the same proportion as the standoff distance is changed. Removal of the constant voltage $V_k$ term is obtained in the amplifier 56 such that the output of the amplifier is the difference between the input signal $V_o$ on lead 54 and the voltage determined by the setting of potentiometer 58 which is chosen to equal $V_k$.

Use is made in the present invention of the fact that the DC standoff function with constant $V_k$ removed and the derivative or AC standoff function 160 are similar exponential curves. That is, by changing the system gain in such a way as to maintain the DC level at a constant value, then the AC signal also remains constant as standoff is varied and any change in the AC output accurately represents changes in vibration magnitude. The automatic gain control is made up of the light dependent resistor 60 which forms with resistor 76 one leg of a voltage divider in combination with the feedback amplifier 68 provided to control the bulb current to filament 64. This circuit functions to maintain the DC level of the signal at a constant voltage $V_{REF}$ as established by potentiometer 74 as the standoff is varied. In this way the AC signal is substantially independent of standoff.

FIG. 3 is a plot of variations in the reading of meter 98 representing Mil-inches (thousandths) of peak-to-peak vibration as a function of standoff distance in Mill-inches. The plot of the curve 162 is fairly flat from about 140 Mil-inches through about 250 Mil-inches of standoff distance. A rise 5 percent above the exact reading is indicated by the dashed line 164, while a falloff of 5 percent below the correct output is indicated by the dashed line 166. An increase in $V_o$ (FIG. 2D) near about 140 Mil-inches as indicated at 168 causes comparator 118 to energize the "Too Close" light bulb 124, whereas the falloff in the probe output level at about 250 Mil-inches as indicated at 170 causes comparator 122 to energize the "Too Far" light bulb 126. Thus, for a constant amplitude of vibration, it can be seen from FIG. 3 that the level of the output varies less than 5 percent above and below the correct reading with changes of standoff distance of well over 100 Mil-inches for a calibrated vibrational amplitude level of 7.2 Mil-inches peak-to-peak.

When the mode switch 92 is manually moved to the runout position, the unit functions in the manner of a non-contact dial indicator. The standoff is first preferably set to 70 percent of full scale with the switch in the vibration mode and pushbutton switch 135 depressed. The meter zero set potentiometer is then adjusted to bring the meter to center scale. If the probe is sensing the surface of the rotating shaft, the meter swings back and forth with the runout of the shaft. The zero set control potentiometer 108 should be adjusted so that the meter excursions are symmetrical on either side of center scale. In this way the total peak-to-peak runout is indicated by the total meter excursion.

With the mode switch 92 in the vibration mode, the signal from the gain control circuit passes through the tunable filter 82 and the detector 86 where the AC signal is detected or rectified and applied through amplifier 88 and the switch 92 to the meter 98. The AC output signal appears on terminal 80 so as to make the AC vibration signal available for firing a strobe. It is preferably calibrated to produce a signal of 0.8 volts rms for full scale meter deflection and its output impedance is 1K ohms.

The distance between the probe tip and the vibrating surface should be set at a value such that neither the "Too Close" nor the "Too Far" lamps are on. If the probe is rigidly mounted, the low frequency response is about 8 Hz. By incorporating a 20 Hz filter into the circuit, the probe may be hand-held for frequencies above 20 Hz. The high frequency response is to about 10 kHz. For frequencies between 8 Hz and 2.5 kHz, the tunable bandpass filter 82 is used to improve the signal to noise ratio. The wide band noise is typically 300 $\mu$ inches. With filtering, this drops to less than 50 $\mu$ inches.

It is apparent from the above that the present invention provides an improved vibration monitor or analyzer and particularly one that gives an accurate vibration output signal from a non-contacting probe that is substantially independent of standoff distance. Important features of the present invention include the provision of an output signal in which both the DC and AC standoff functions vary in a similar manner and the incorporation of a gain control circuit for maintaining the DC component substantially constant so that the AC component is also substantially constant. By maintaining the AC component due to standoff substantially constant, any variation in the AC output is truly representative of changes in the magnitude of vibration of the piece being tested and is not wholly or partly due to changes in standoff distance as in previous constructions. A further important feature of the present invention resides in the provision of a meter zero adjustment for operating the device in a runout mode so that the meter indicates runout in the manner of a non-contact dial indicator. Through the incorporation of range switching and tunable filtering, the instrument can be used as a complete vibration analyzer.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A vibration analyzer comprising a high frequency oscillator, an inductive probe coupled to said oscillator, said probe producing an electrical output indicative of the proximity of said probe to a metal surface, said output including both AC and DC components bearing an exponential relationship to standoff distance, with said DC component including a constant DC level, means including a difference amplifier coupled to the output of said probe for removing said constant DC level from said probe output, an automatic gain control circuit coupled to the output of said amplifier and including a voltage divider with a variable resistor, a tunable filter coupled to the output of said gain control circuit, a DC meter, a detector coupled to the output of said filter, a switch having a first position for coupling said detector to said meter, and a meter zero potentiometer coupled to the output of said difference amplifier, said switch having a second position for coupling said potentiometer to said meter.

2. Apparatus according to claim 1 including a second detector connected between the output of said probe and said difference amplifier.

3. Apparatus according to claim 2 including a low pass filter coupling said second detector to said difference amplifier.

4. Apparatus according to claim 1 wherein said AC and DC components of said probe output both vary as exponentials of the standoff distance of said probe from said metal surface.

5. Apparatus according to claim 1 including an AC output terminal connected between said gain control circuit and said tunable filter.

6. A vibration analyzer comprising a non-contacting transducer probe for producing an electrical output indicative of the proximity of said probe to a metal surface, said output including both AC and DC components that vary similarly with the standoff distance of said probe from said surface, an automatic gain control circuit including a voltage divider coupled to the output of said probe, said voltage divider including a light sensitive resistor, a light emitter adjacent said resistor, and a feed back circuit coupled between the output of said resistor and said light emitter for maintaining said DC component substantially constant whereby the AC output of said probe is substantially independent of standoff distance, the DC component $V_o$ of said output corresponding to the effect on the probe of the standoff distance S according to the relationship $V_o = A\exp(-BS) + V_k$ where A, B, and $V_k$ are constants, and further including means connected between said probe output and the input of said gain control circuit for subtracting a signal level corresponding to said constant $V_k$.

* * * * *